United States Patent [19]

Chadwick

[11] Patent Number: 5,170,975
[45] Date of Patent: Dec. 15, 1992

[54] ARTICULATED ARM WITH SPRING FOR COUNTERBALANCING

[76] Inventor: Alan Chadwick, 940 25th St., NW. (Apt. 315-S), Washington, D.C. 20037

[21] Appl. No.: 710,975

[22] Filed: Jun. 6, 1991

[51] Int. Cl.⁵ ............................................. E04G 3/00
[52] U.S. Cl. ................................. 248/284; 248/292.1; 362/402; 403/53
[58] Field of Search ............... 248/280.1, 281.1, 282, 248/283, 123.1, 274, 276, 284, 292.1; 403/53, 85, 93; 362/402, 427, 413

[56] References Cited

U.S. PATENT DOCUMENTS

| | | |
|---|---|---|
| 476,739 | 6/1892 | Flaherty . |
| 3,041,060 | 6/1962 | Jacobsen . |
| 3,219,303 | 11/1965 | Stryker . |
| 3,239,184 | 3/1966 | Kirkeby . |
| 3,243,497 | 3/1966 | Kendall et al. ............. 248/282 X |
| 3,280,322 | 10/1966 | Kirkeby . |
| 3,391,890 | 7/1968 | Perbal . |
| 3,396,931 | 8/1968 | Eckstein . |
| 3,489,384 | 1/1970 | Perbal . |
| 3,543,019 | 11/1970 | Jacobsen . |
| 3,790,773 | 2/1974 | Sapper . |
| 4,080,530 | 3/1978 | Krogsrud . |
| 4,160,536 | 7/1979 | Krogsrud . |
| 4,165,530 | 8/1979 | Sowden ..................... 248/280.1 X |
| 4,213,172 | 7/1980 | Scattolin et al. . |
| 4,213,591 | 7/1980 | Jaakkola ......................... 248/281.1 |
| 4,234,150 | 11/1980 | Mee et al. ...................... 248/281.1 |
| 4,296,906 | 10/1981 | Matthijsse . |
| 4,545,555 | 10/1985 | Koch . |
| 4,770,384 | 9/1988 | Kuwazima et al. ............ 362/402 X |
| 4,846,434 | 7/1989 | Kroesrud ....................... 248/280.1 |
| 4,852,842 | 8/1989 | O'Neill ........................... 248/280.1 |
| 4,953,822 | 9/1990 | Sharber et al. ................. 248/281.1 |
| 5,016,153 | 5/1991 | Gismondi et al. ................. 362/402 |

FOREIGN PATENT DOCUMENTS 0618344  2/1949  United Kingdom ............ 248/281.1

Primary Examiner—Ramon O. Ramirez
Attorney, Agent, or Firm—William D. Hall

[57] ABSTRACT

Two arm sections are interconnected by a connection to provide an articulated arm. The connection includes mating gear wheels with one such wheel on each of the two arms. The connection also includes side pieces for providing a fixed distance between the respective axes of the gear wheels. The side pieces include an extension which constitutes a lever. As the angle between the sections of the articulated arm, varies the lever moves to increase or decrease the tension in a spring that counterbalances the varying forces on the articulated arm.

20 Claims, 4 Drawing Sheets

ARTICULATED ARM WITH SPRING FOR COUNTERBALANCING

BACKGROUND OF THE INVENTION

Articulated arms for supporting a load such as a lamp are well known, see U.S. Pat. Nos. 476,739 issued June 7, 1892, to Flaherty, 4,132,172 issued July 15, 1980, to Scattolin, 4,296,906, issued Oct. 27, 1981 to Matthijsse, 3,489,384 issued Jan. 13, 1970 to Perbal, 3,396,931, issued Aug. 3, 1968 to Eckstein, 3,391,890, issued July 9, 1968 to Perbal, 4,545,555, issued Oct. 8, 1985 to Koch.

Other such patents include Sapper, U.S. Pat. No. 3,790,773 issued Feb. 5, 1974, Eckstein, U.S. Pat. No. 3,396,931 issued Aug. 13, 1968, and Stryker U.S. Pat. No. 3,219,303 issued Nov. 23, 1965.

Jacobson U.S. Pat. No. 3,041,060, issued June 26, 1962, shows an articulated structure with a spring acting as equipoising means.

Jacobson U.S. Pat. No. 3,543,019, issued Nov. 24, 1970, teaches an articulated structure with "springs 15 and 16 mounted respectively on assemblies 4 and 5, to provide counterbalancing forces, so that the lamp will remain at rest in any selected position."

U.S. Pat. Nos. to Krogsrud, 4,160,536 issued July 10, 1979 and No. 4,080,530, issued Mar. 21, 1978, teach counterbalancing springs for articulated structures such as lamps and television sets.

U.S. Pat. No. 4,165,530 to Sowden teaches an articulated lamp structure with a spring 27. The entire structure is said to be balanced by resilient and frictional forces.

Two U.S. Pat. Nos. to Kirkeby, 3,239,184, issued Mar. 8, 1966 and 3,820,322 issued Oct. 18, 1966, provide structures including springs to counterbalance lamps.

The aforesaid patents make it clear that when an articulated arm supports a load, such as a lamp, the gravitational forces tending to destabilize the articulated arm are much greater when the load is at an extended lateral position, from the support for the articulated arm, than they are when the load is vertically above the support. Some of said prior art patents teach that a spring may be used to counterbalance those gravitational forces.

SUMMARY OF THE INVENTION

A connection joins first and second arms to form an articulated arm. Each of the first and second arms has first and second ends. The first end of the first arm is supported by a base or other support. The connection connects the second end of the first arm to the first end of the second arm.

The connection includes the following: first and second gear wheels mounted on the second end of the first arm and the first end of the second arm, respectively. Side plates hold the gear wheels in a mating relation, and also include an extension that acts as a lever.

The aforesaid lever rotates as the angle between the two arms changes. This rotation increases or decreases the tension of a spring. The varying tension of the spring counterbalances the varying gravitational forces on the first and second arms due to the changes in the angle, between said arms.

DETAILED DESCRIPTION OF THE INVENTION

Figure 1:
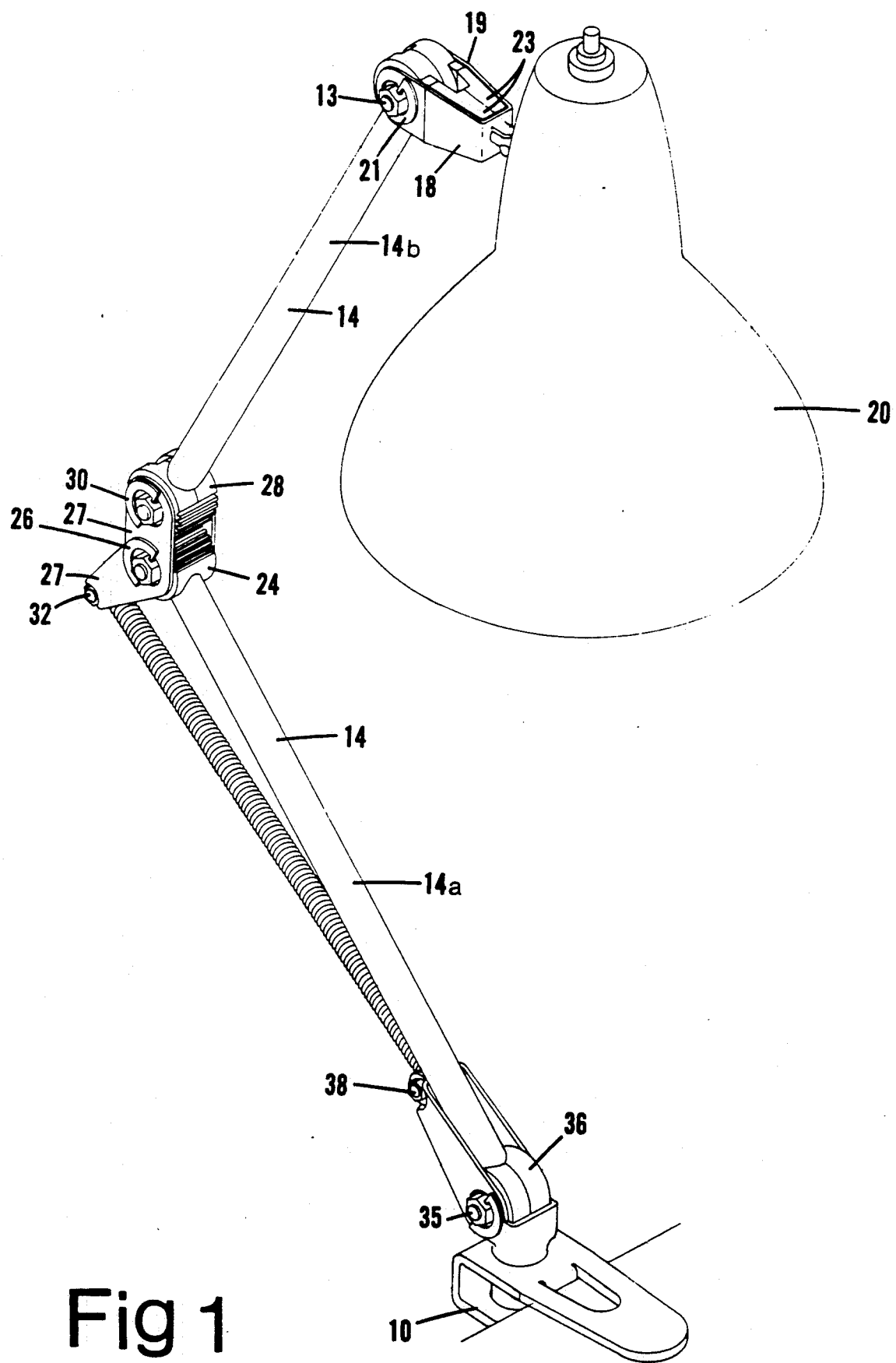
FIG. 1 is a perspective view of the invention as applied to an adjustable lamp.
Figure 2:
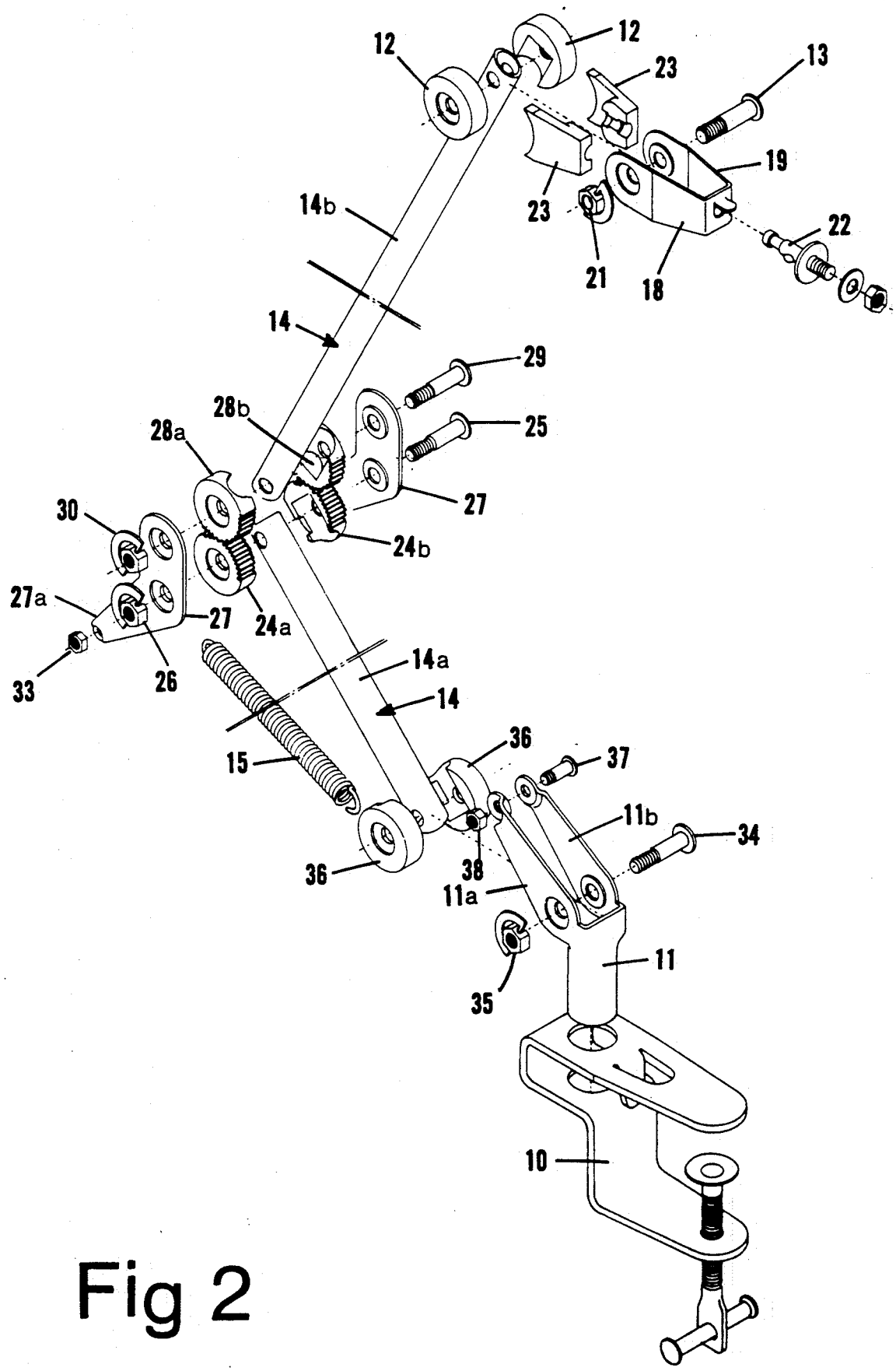
FIG. 2 is an exploded view of the apparatus of FIG. 1.

The lamp 20 of FIG. 1 is supported by the articulated arm 14 which is pivotally connected at its lower end to the clamp 10. The arm 14 is connected to clamp 10 by connecting means 11. The lamp 20 is supported from the upper end of the articulated arm 14. The means 12, 13, 18, 19 for connecting the upper end of the arm 14 to the lamp 20 is conventional. This connecting means comprises a U-shaped bracket 18, 19 the right end of which is attached to the lamp 20. The arms 18 and 19 of the U-shaped bracket have a bolt 13 about which the arm 14 pivots relative to the bracket 18, 19. When the wing nut 21 is tightened the arms 18 and 19 are forced against the side walls of arm 14 thereby holding the lamp 20 in a fixed position relative to arm 14. The lamp 20 may be rotated relative to arm 14 by loosening nut 21 and rotating the lamp about bolt 13 which acts as a pivot. Washers 12 are located between the arms 18 and 19 and the arm 14. The lamp 20 has a supporting pin 22 which enters the end of U-shaped bracket 18, 19 and is held by clamps 23 which are forced together when the wing nut 21 is tightened.

The lower arm 14a, of the articulated arm 14, has gear wheel 24 attached to its upper end. The gear wheel 24 consists of two pieces 24a and 24b which have slots for receiving the upper end of arm 14a. The gear wheel 24 thus is securely fixed to the upper end of arm 14a. Bolt 25, with wing nut 26, hold the two side pieces 27 against the side walls of the gear wheel 24.

The lower end of arm 14b fits in slots in gear wheel 28 which consist of two pieces 28a and 28b. The bolt 29, with its wing nut 30, clamps the side pieces 27 against the side walls of of gear wheel 28. The wing nuts 26 and 30 may be tightened to secure the arms 14a and 14b in a fixed relation to each other. The side pieces 27 are further connected by a bolt 32, that has a nut 33, and receives a hook at the upper end of helical spring 15.

The U-shaped clamp 11 has arms 11a and 11b for receiving bolt 34. Wing nut 35 cooperates with bolt 34 so that the wing nut 35 may be tightened to fix the relation between arms 11a, 11b and both the lower arm 14a and its washers 36. A bolt 37 passes through holes located near the free ends of arms 11a and 11b. Nut 38 holds bolt 37 in place. The bolt 37 receives the hook at the lower end of spring 15.

The plastic gear wheels 24 and 28 may have teeth over the entire 360 degrees of their periphery, or alternatively the teeth may cover only a sector of the periphery. Moreover, the gear wheels 24 and 28 may include a special tooth, or other means, to limit the angle over which the arms 14a and 14b may move relative to each other.

Figure 8:
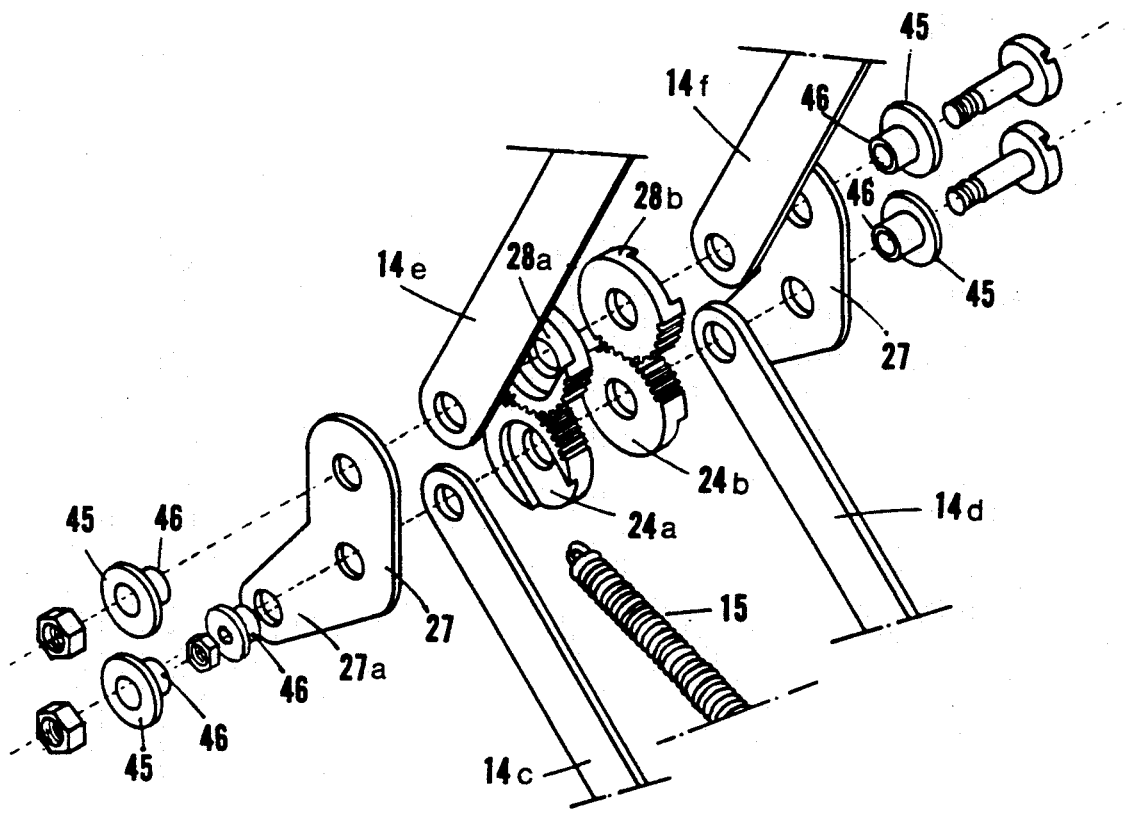
FIG. 8 illustrates a low voltage lamp version of the invention.

FIG. 8 shows how the invention may be applied to a low voltage (12 volts) lamp. Strips or bars 14c and 14d in FIG. 8 replace tube 14a of FIGS. 1 to 7. Similarly strips 14e and 14f replace tube 14b. The low voltage is fed to the lamp along strips 14c and 14e and also along strips 14e and 14f. To avoid short circuits, insulating washers 45 are used. These washers have hollow insulating projections 46 which pass into the metal parts such as 14c, 14d, 14e, 14f, 27.

OPERATION

When the several wing nuts 21, 26, 30 and 35 are slightly loosened the articulated arm 14 may be moved to any of the positions shown in FIGS. 3 to 7, incl. or to any intermediate position.

Figures 3, 4, 5:
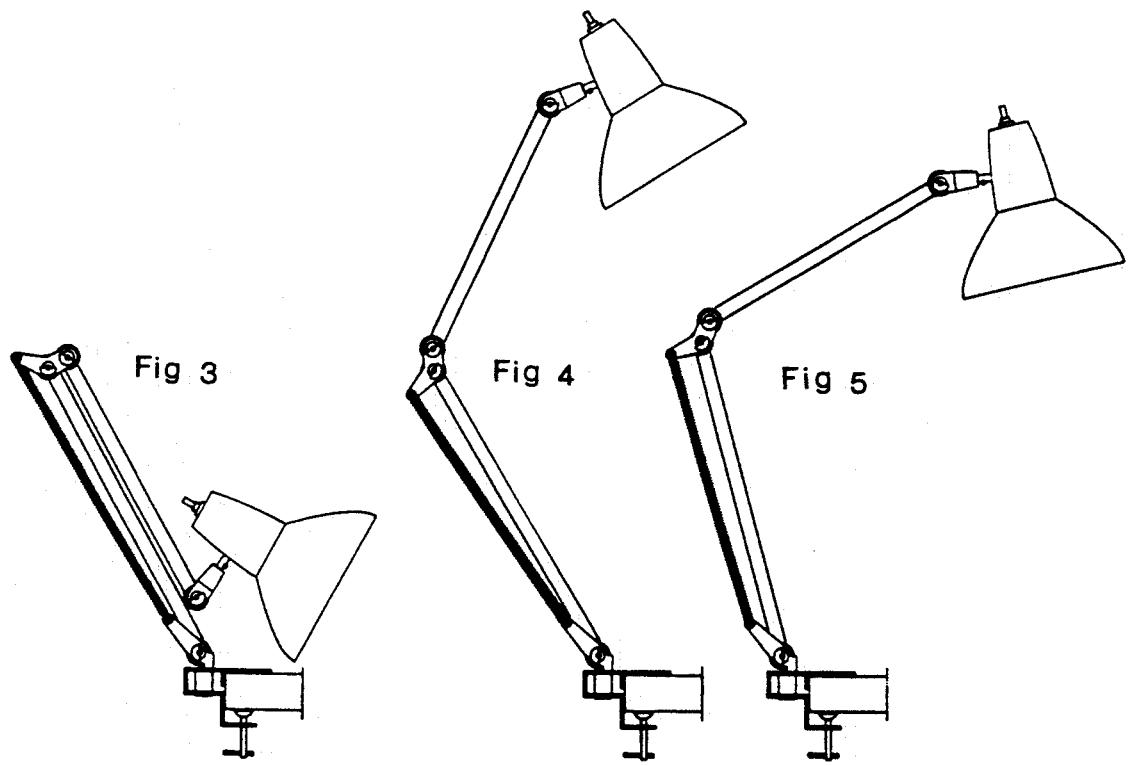
FIGS. 3 to 7 illustrate the lamp of FIG. 1 in five different positions.
Figures 6, 7:
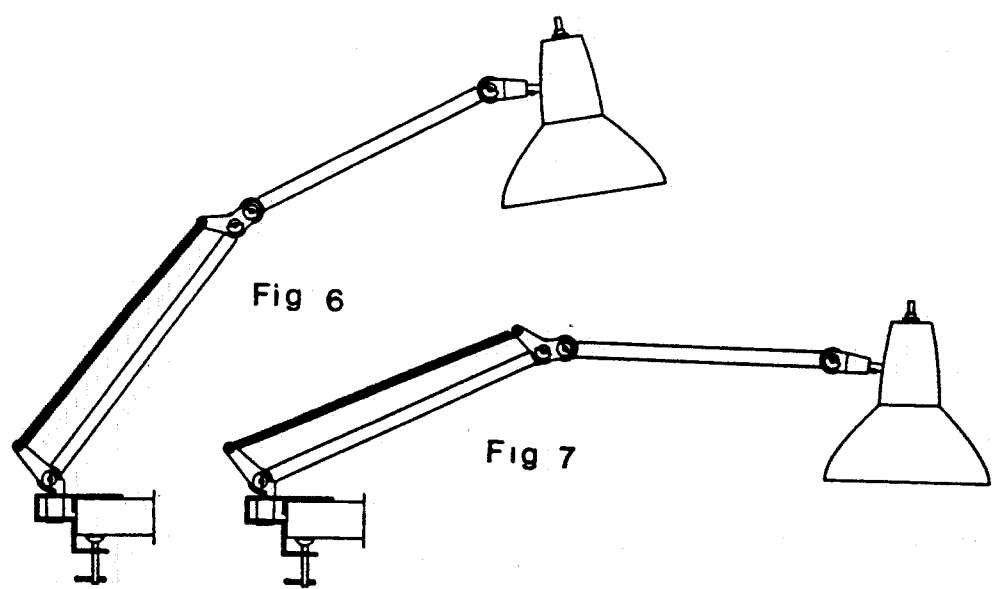

It is noted that as the lamp 20 is moved from the position of FIG. 4 to the position of FIG. 7, the side plates 27 rotate about bolt 25 to swing bolt 32 clockwise and thereby increase the tension in spring 15. This increased tension tends to rotate side plates 27 counterclockwise. At the same time the movement of the lamp to the right from FIGS. 4 to FIG. 7 applies a torque to side plates 27 tending to rotate them clockwise. By selecting a correct spring 15, the additional torque tending to rotate side plates 27, when the lamp 20 is moved from FIG. 4 to FIG. 7, will be substantially exactly counterbalanced by the added tension in spring 15.

Once the desired position of the lamp 20 is selected, the articulated arm 14 remains in place by reason of the friction provided by wing nuts 35, 26 and 30.

The varying tension of spring 15 is due to the extension or projection 27a which acts as a lever. Since the bolt 37 remains stationary while the lamp 20 is moved from the position of FIG. 3 to the position of FIG. 7, it is the position of the bolt 32 that determines the tension of the spring 15. It is noted that as the lamp 20 moves from the position of FIG. 3 to that of FIG. 7, the bolt 32 rotates clockwise about bolt 25 and thus moves farther away from bolt 37 thereby increasing the tension in spring 15. This increased tension counterbalances the increased torque resulting from the increase in leverage as the articulated arm 14 moves from its position shown in FIG. 3 to its position of FIG. 7.

I claim to have invented:

1. An articulated arm, comprising:
   first and second arms, each having an end,
   first and second mating gears which are on an end of each of said first and second arms, respectively,
   means for holding said gears in a mating relationship to provide a variable angle between said first and second arms, and for applying a force to at least one of said first and second arms which force varies with changes in said angle between said first and second arms,
   said means comprising a lever extending away from said first gear, and
   a spring for biasing said lever thereby applying a force tending to move at least one of said first and second arms.

2. An articulated arm as defined in claim 1, comprising:
   said first arm having another end,
   a support for said another end of said first arm, said articulated arm extending to an elevation higher than said support so that there are gravitational forces tending to render the articulated arm unstable,
   said means producing a force tending to at least partially counterbalance said gravitational forces and thereby improve the stability of the articulated arm.

3. An articulated arm as defined in claim 2 comprising:
   said second arm having another end,
   a load carried by said second arm near said another end, at least a part of said gravitational forces comprising the force of gravity on said load.

4. An articulated arm as defined in claim 3 in which said load is a lamp.

5. An articulated arm, comprising:
   first and second arms, each having an end,
   first and second mating gears which are on an end of each of said first and second arms, respectively,
   means for holding said gears in a mating relationship to provide a variable angle between said first and second arms, and for applying a force to at least one of said first and second arms which force varies with changes in said angle between said first and second arms,
   said articulated arm being subject to gravitational forces tending to change the angle between said first and second arms,
   said means applying a force to said articulated arm tending to at least partially counterbalance said gravitational forces,
   said means including a lever extending away from said gears, and a spring for biasing said lever for at least partially compensating for said gravitational forces.

6. An articulated arm as defined in claim 5, comprising:
   said first arm having another end,
   a support, at said another end, for supporting said articulated arm,
   said spring, extending between said lever and said support, for applying a force to said articulated arm.

7. An articulated arm as defined in claim 6 comprising:
   said second arm having another end,
   said means comprising at least one side plate having an extension that forms said lever.

8. An articulated arm comprising:
   first and second arms, each having an end,
   means connected to one of said ends for enabling one of said first and second said arms to swing relative to the other one of said first and second arms,
   said means including at least one side plate connecting said first and second arms,
   said side plate having an extension which forms a lever, and
   a spring attached to said lever for applying a force to said lever that varies during at least some of the movements of said articulated arm.

9. An articulated arm as defined in claim 8, comprising:
   said first and having another end,
   a support, for said articulated arm, positioned at said another end,
   said spring extending between said lever and said support.

10. An articulated arm as defined in claim 9, comprising:
    said second arm having a second end,
    a load supported by said second arm near said second and thereof,
    said spring comprising means for at least partially counterbalancing the gravitational forces on said articulated arm and on said load.

11. An articulated arm as defined in claim 10, comprising: said load comprising a lamp.

12. An articulated arm as defined in claim 10 comprising:
   said gears comprising first and second gear wheels,
   said first gear wheel being mounted on one end of said first arm and the second gear being mounted on one end of said second arm, said gear wheels having two sides,
   said means including side plates on both sides of said gear wheels and also including means for pressing said side plates against said gear wheels to lock the wheels against relative movement.

13. An articulated arm as defined in claim 10, in which said means connected to said ends comprises first and second mating gears mounted in fixed relation to said first and second arms respectively.

14. An articulated arm, as defined in claim 13, comprising:
   means to prevent relative movement of said gears.

15. An articulated arm as defined in claim 12 comprising:
   said load comprising a lamp,
   each of said first and second arms comprising a pair of parallel electrical conductors insulated from each other for carrying electricity to said lamp.

16. An articulated arm as defined in claim 8, comprising:
   said articulated arm having two ends,
   means for supporting one end of said articulated arm, and
   a lamp carried at the other end of said articulated arm,
   said spring at least partially counterbalancing said articulated arm and said lamp.

17. An articulated arm, comprising:
   first and second arms, each having an end,
   first and second mating gears which are on an end of each of said first and second arms, respectively, and
   means for holding said gears in a mating relationship to provide a variable angle between said first and second arms, said means including force producing means for applying a force to at least one of said first and second arms which force varies with changes in said angle between said first and second arms,
   said force producing means including a lever extending away from said one arm and also including means for applying a force to a portion of said lever that is spaced from said one arm.

18. An articulated arm as defined in claim 17 in which said force producing means includes a spring.

19. An articulated arm as defined in claim 18 in which said lever increases the force applied by said spring to at least one of said arms.

20. An articulated arm as defined in claim 17, comprising:
   said one arm having an end that is remote from said gears,
   a lamp mounted on said end that is remote form said gears,
   the other arm having an end that is remote from said gears, and
   means for supporting said end, of said other arm, that is remote from said gears,
   said force producing means acting to at least partially counterbalance the articulated arm and said lamp.

* * * * *